June 14, 1960

L. H. LEONARD, JR

PURGING ARRANGEMENTS FOR ABSORPTION REFRIGERATION SYSTEMS 2,940,273

Filed Feb. 14, 1956

9 Sheets-Sheet 1

INVENTOR.

LOUIS H. LEONARD, JR.

BY Herman Seid

ATTORNEY.

INVENTOR.
LOUIS H. LEONARD, JR.
BY Herman Seid
ATTORNEY.

June 14, 1960 L. H. LEONARD, JR 2,940,273

PURGING ARRANGEMENTS FOR ABSORPTION REFRIGERATION SYSTEMS

Filed Feb. 14, 1956 9 Sheets-Sheet 3

INVENTOR.
LOUIS H. LEONARD, JR.

BY Herman Seid

ATTORNEY.

INVENTOR.
LOUIS H. LEONARD, JR.
BY
Herman Seid
ATTORNEY.

June 14, 1960 L. H. LEONARD, JR 2,940,273

PURGING ARRANGEMENTS FOR ABSORPTION REFRIGERATION SYSTEMS

Filed Feb. 14, 1956 9 Sheets-Sheet 5

INVENTOR.
LOUIS H. LEONARD, JR.

BY

Herman Seid

ATTORNEY.

*INVENTOR.*

LOUIS H. LEONARD, JR.

*BY*

Herman Seid

ATTORNEY.

June 14, 1960 L. H. LEONARD, JR 2,940,273

PURGING ARRANGEMENTS FOR ABSORPTION REFRIGERATION SYSTEMS

Filed Feb. 14, 1956 9 Sheets-Sheet 7

INVENTOR.
LOUIS H. LEONARD, JR.
BY Herman Seid
ATTORNEY.

INVENTOR.
LOUIS H. LEONARD, JR.
BY
Herman Seid
ATTORNEY.

INVENTOR.
LOUIS H. LEONARD, JR.
BY Herman Seid
ATTORNEY.

2,940,273

PURGING ARRANGEMENTS FOR ABSORPTION REFRIGERATION SYSTEMS

Louis H. Leonard, Jr., East Syracuse, N.Y., assignor to Carrier Corporation, Syracuse, N.Y., a corporation of Delaware Filed Feb. 14, 1956, Ser. No. 565,324

30 Claims. (Cl. 62—85)

This invention relates to a purging arrangement for an absorption refrigeration system, and more particularly, to a purging arrangement for withdrawing non-condensible gases from the refrigeration system without substantial loss of refrigerant or absorbent in the system.

In Berestneff, Patent No. 2,520,027, granted August 22, 1950, there is disclosed a purge mechanism for an absorption refrigeration system which includes a steam ejector and a water ejector disposed in series to withdraw air or other non-condensible gases from the absorber and condenser of the absorption refrigeration system. This mechanism is satisfactory in use but is somewhat expensive in initial cost and operating costs and requires considerable maintenance in use. The mechanism operates continuously so that over a period of time small quantities of refrigerant and absorbent are withdrawn from the system and discharged to waste with the non-condensible gases, steam condensate and water employed to actuate the water ejector.

The chief object of the present invention is to provide a purging arrangement for an absorption refrigeration system which obviates the disadvantages inherent in prior arrangements.

An object of the invention is to provide a purging arrangement for absorption refrigeration systems which returns refrigerant withdrawn from the refrigeration system to the system, thus eliminating the necessity of additional refrigerant and/or absorbent being added to the system during long continuous periods of operation.

A further object is to provide a purging arrangement for an absorption refrigeration system employing an absorbent solution substantially the same as the absorbent solution employed in the refrigeration system which is capable of withdrawing non-condensible gases and reclaiming and returning refrigerant to the refrigeration system without interference with the operation of the refrigeration system.

A still further object is to provide a purging arrangement for an absorption refrigeration system which is effective to withdraw non-condensible gases and to return automatically excess absorbent solution to the refrigeration system, thus eliminating waste and inefficient operation of the refrigeration system. Other objects of the invention will be readily perceived from the following description.

This invention relates to a purging arrangement for an absorption refrigeration system comprising, in combination, a container, and means for discharging or circulating solution in the container preferably including a pump and an ejector connected thereto. Suitable connections are provided to connect the ejector with the absorber of the absorption refrigeration system. Thus, discharge of solution through the ejector by the pump induces non-condensible gases from the absorber and forwards the non-condensible gases to the container for discharge to ambient atmosphere. Suitable means, preferably, automatically operable, are provided for discontinuing withdrawal of non-condensible gases from the absorber while permitting solution in the container to be forwarded to the absorber through the ejector. If desired, of course, the pump and ejector may be employed to return solution from the container to the absorber of the machine, or if desired operation of the pump may be discontinued and pressure of ambient atmosphere employed to force a desired volume of solution from the container to the absorber.

This invention further relates to a method of purging an absorption refrigeration system including an absorber, an evaporator, a generator and a condenser in which the steps consist in discharging solution in a container to induce non-condensible gases from the absorber and, when the volume of solution in the container increases to a desired level, discontinuing withdrawal of non-condensible gases from the absorber while supplying solution in the container to the absorber.

The attached drawings illustrate certain preferred embodiments of the invention, in which Figure 1 is a diagrammatic view of an absorption refrigeration system including the purging arrangement of the present invention;

Figures 5, 13, 14:
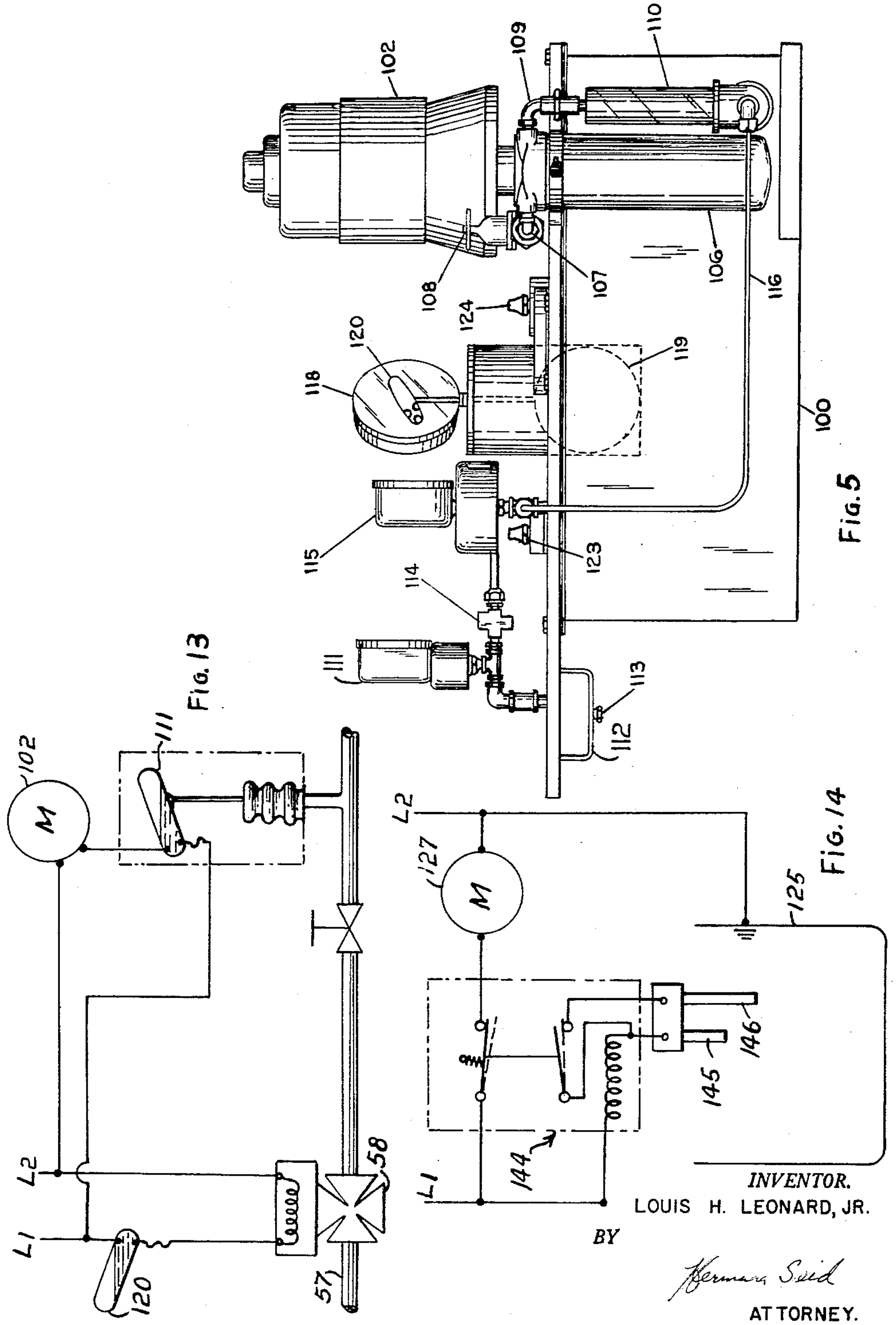
Figure 5 is a view in elevation of the purging arrangement shown in Figure 4.

Figure 13 is a schematic wiring diagram illustrating the manner in which switch 120 and motor 102 are interconnected; and Figure 14 is a schematic wiring diagram illustrating the manner in which switch 144 and motor 127 are interconnected.

Figure 1:
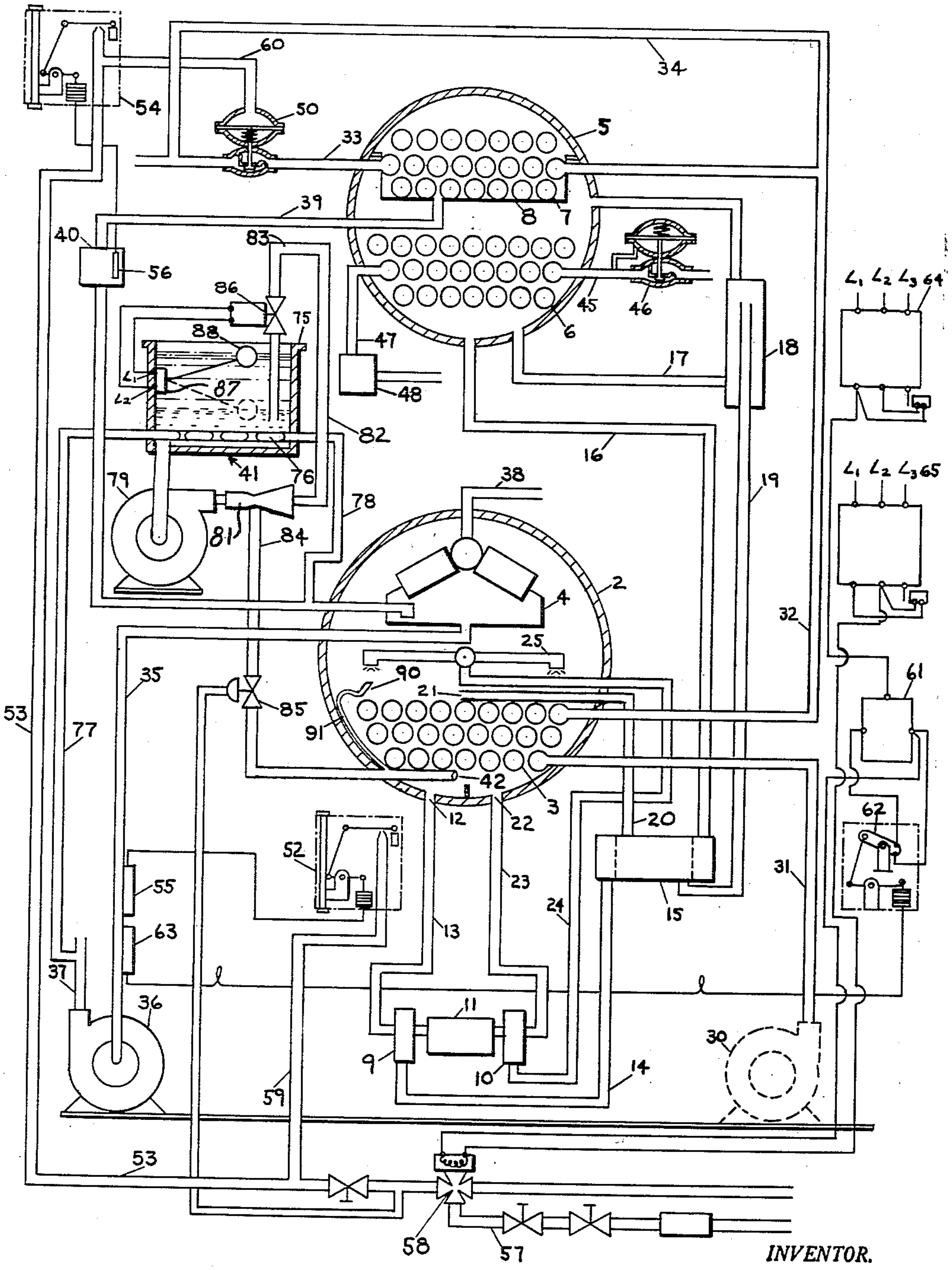
Figure 2:
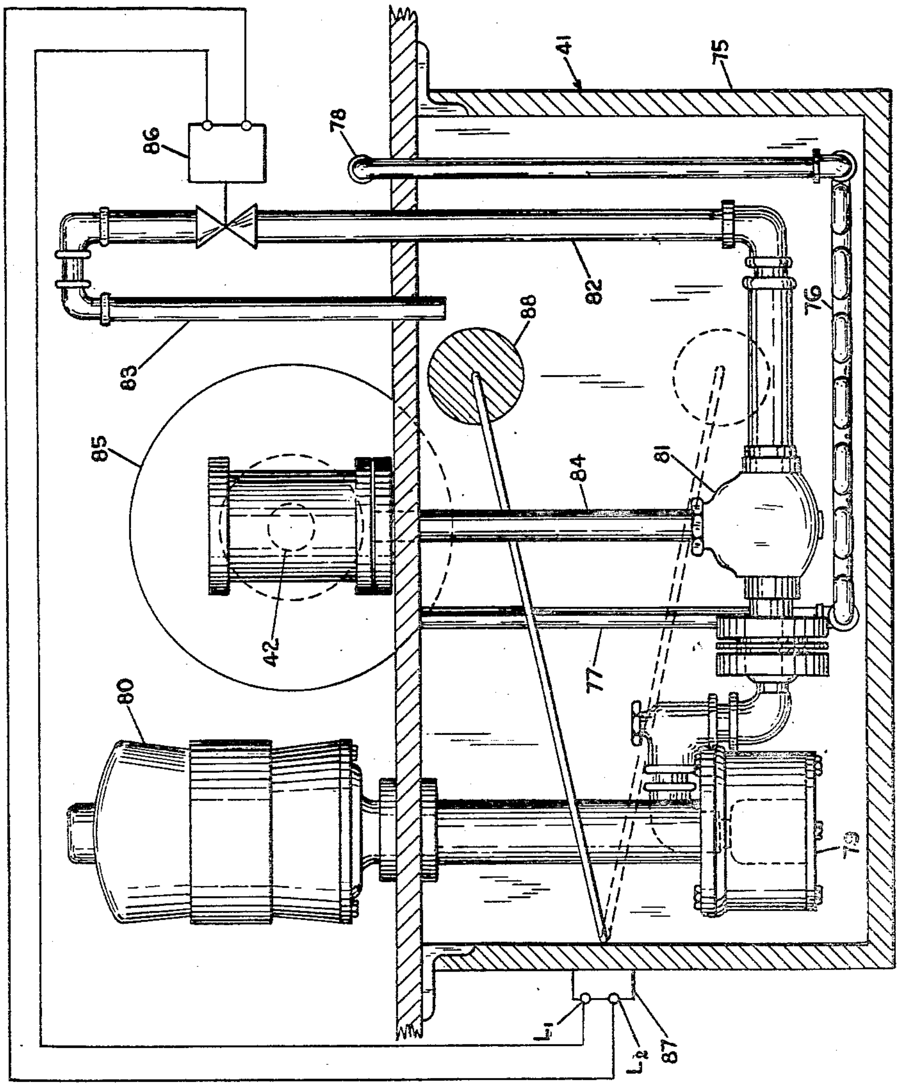
Figure 2 is a sectional view of the purging arrangement.
Figure 3:
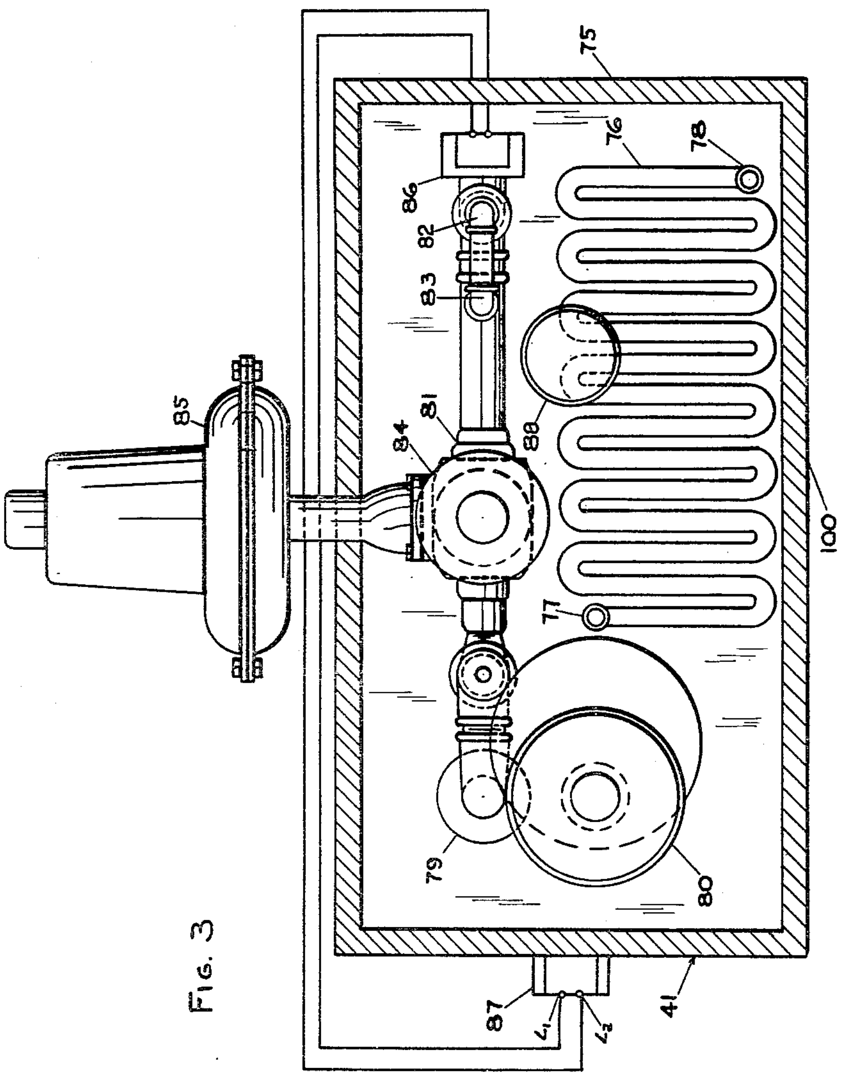
Figure 3 is a plan view of the purging arrangement shown in Figure 2, illustrating the manner in which the various elements of the arrangement are placed in the container.

Referring to the attached drawings, there is illustrated in Figures 1, 2 and 3 the purging arrangement of the present invention employed in an absorption refrigeration system of the type disclosed and claimed in my copending application, Serial No. 505,369, filed May 2, 1955. Referring specifically to Figure 1, the absorption refrigeration system comprises a shell 2 containing a plurality of tubes 3 which cooperate with the shell to form an absorber. Placed in shell 2 above absorber 3 is a pan-like member 4 which cooperates with shell 2 to form an evaporator.

A second shell 5, preferably, is placed above the first shell. Tubes 6 extend in the lower portion of shell 5 and cooperate with shell 5 to form a generator or boiler. A plurality of tubes 7 are placed in the upper portion of shell 5 which cooperate with a pan-like member 8 to form a condenser.

A double pump arrangement is provided to circulate solution through the system. This arrangement includes pump 9 which serves to supply weak solution from the absorber to the generator and pump 10 which serves as an absorber pump. Pumps 9 and 10 are driven by a motor 11. If desired, separate motors may be provided.

Pump 9 withdraws weak solution from absorber 3 through outlet or sump 12 and line 13. Pump 9 forwards the weak solution through line 14, heat exchanger 15 and line 16 to generator 6. Strong solution is drawn from generator 6 through line 17 to an overflow arrangement 18 which maintains a desired level of solution in generator 6 and is returned to the absorber through line 19, heat exchanger 15, line 20 and inlet 21 of absorber 3 by forces of gravity. Strong solution may be dumped in the absorber over the tubes 3 or if desired may be discharged against an interior wall of shell 2.

Pump 10 is the absorber pump and is employed to withdraw a solution of intermediate concentration from absorber 3 through outlet 22 and line 23, forwarding the recirculated solution through line 24 to the spray arrangement 25 of the absorber. Sprays 25 serve to distribute the recirculated solution over the tubes throughout the length of the absorber 3. It will be understood the strong solution mixes to some extent with solution in the absorber and that further mixing occurs as pump 10 forwards the mixed solution so that a solution having a concentration intermediate the concentrations of the strong and weak solutions is circulated. It is important that the strong solution be discharged in the absorber at a place where interference with the purging operation cannot occur.

The strong solution is superheated with regard to pressure existing in the absorber so that it flash cools upon discharge in the absorber liberating a considerable amount of water vapor. It is important that this vapor be liberated in a manner that does not interfere with the collection of noncondensible gases at a specific location beneath the tubes.

Pump 30 supplies condensing water through line 31 to the tubes 3 of the absorber. The condensing water after passage through tubes 3 passes through line 32 to the tubes 7 of the condenser. The condensing water after passage through the tubes of the condenser is discharged to a cooling tower or drain through line 33. If desired a by-pass line 34 is provided about tubes 7 of the condenser, extending from line 32 to line 33.

Chilled water is withdrawn from the evaporator 4 through line 35 by pump 36 and is circulated to a place of use which may be the central station of an air conditioning system through line 37. The chilled water is returned to the evaporator through line 38 and is flash-cooled in the evaporator the flashed vapor passing to the absorber.

Condensate leaves condenser 7 through line 39 and is returned to the evaporator, being flash-cooled in the evaporator, the flashed vapor passing to the absorber, as previously described. A tank or container 40 is placed in line 39, for a purpose hereinafter described.

The purging arrangement 41 of the present invention is provided to remove non-condensible gases from the system. This purging arrangement will be more fully described hereinafter. A purge line 42 extends generally longitudinally of the absorber below the tube bundle, preferably, at the center of the bundle. Steam is supplied to the tubes 6 of the generator through line 45. A pressure regulating valve 46 may be placed in line 45 to assure desired steam pressure in the generator. Valve 46 assures that pressure of steam passing to the generator is controlled at a predetermined point.

Steam condensate leaves the tubes of generator 6 through line 47, a steam trap 48 being placed in line 47 to assure that only condensate leaves the generator.

A normally closed pneumatic valve 50 is placed in line 33 between the tubes 7 of the condenser and the connection of by-pass line 34 with line 33. Valve 50 regulates passage of condensing water through the tubes of condenser 7. By-pass 34 assures that flow of condensing water is maintained substantially constant while permitting variation in the flow of condensing water through the tubes of condenser 7.

A thermostatic control 52 regulates the pressure of air passing through branch line 53 to a second thermostatic control 54. Thermostatic control 54 in turn regulates the air pressure applied to valve 50. Control 52 is actuated by means of a bulb 55 placed adjacent chilled water line 35. Bulb 55 reflects the temperature of chilled water which in turn indicates the load imposed upon the system. Control 54 is actuated by bulb 56 placed in container 40 in line 39 and reflects saturation temperature corresponding to pressure in shell 5.

Compressed air is supplied to the controls through main air line 57. Preferably a solenoid valve 58 or relay of suitable design is placed therein as a safety control. Air pressure passes from line 57 to line 53. Thermostat 52 is connected to line 53 by branch line 59; thus, pressure in branch line 53 may be regulated by thermostat 52 bleeding a portion of air therein to the atmosphere in accordance with the temperature of the chilled water reflecting the load imposed upon the system. Branch line 53 is connected to valve 50 by line 60. Thermostats 52 and 54 regulate the air pressure supplied to the diaphragm of valve 50.

A rotary switch 61 is provided which is connected to a mercury switch 62. Mercury switch 62 may be actuated by means of a bellows and a bulb 63 placed adjacent chilled water line 35 and reflecting the temperature of chilled water therein. Mercury switch 62 serves in effect as a safety control. An increase in temperature of chilled water above a predetermined point opens this switch thereby closing valve 58 to prevent supply of air to controls 52, 54 and valve 50. The starters 64 and 65 actuate the motor 11 of pumps 9, 10 and the motor (not shown) of chilled water pump 36. The starter for the condensing water pump 30 is not shown since such pump and motor are generally provided by the installer.

The control arrangement shown herein is disclosed in my Patent No. 2,722,805, issued November 8, 1955, entitled Control Arrangement for Absorption Refrigeration System, and reference is made to such patent for a full description of the control arrangement and the manner in which it operates.

The term "weak solution" is used herein to describe a solution weak in absorbing power. The term "strong solution" is used herein to define a solution strong in absorbing power.

A preferred absorbing solution is a solution of lithium bromide in water; the preferred refrigerant is water. With such solution preferably, the solution concentration leaving the generator is 66%. A greater concentration may permit crystallization to occur, causing solidification in the heat exchanger and, perhaps, in other portions of the system.

The purging arrangement 41 is shown in Figures 2 and 3. Referring to Figures 2 and 3 there is shown a container or tank 75 adapted to contain a solution of absorbent and refrigerant similar to the absorbent and refrigerant used in the absorption refrigeration system. Preferably, the container 75 is thermal and sound insulated. The solution employed in the present purging arrangement comprises a solution of lithium bromide and water similar to the absorbent and refrigerant employed in the absorption refrigeration system with which the purging arrangement is employed. It will be understood, of course, other solutions of absorbent and refrigerant may be employed depending upon the absorbent and refrigerant employed in the refrigeration system.

A cooling coil 76 is placed in the container and is connected to chilled water line 37 or the outlet of pump 36 by line 77. The outlet of coil 76 is connected to line 78 through which chilled water after passing through the coil in heat exchange relation with absorption solution in container 75 is returned to the evaporator 4 of the refrigeration system. It will be understood other sources of supply of cooling water may be employed, if desired. A pump 79 driven by motor 80 is connected to an ejector 81. Ejector 81 is connected to line 82 in which a loop 83 is formed to return solution passing through line 82 to the container. The suction side of ejector 81 is connected to purge line 42 of the absorber by a line 84. A suitable shut-off valve 85 is placed in line 84.

A solenoid valve 86 is placed in line 82 for a purpose hereinafter described. Valve 86 is regulated by means of a switch 87 and float 88 which energizes or deenergizes an electrical circuit containing switch 87 and the solenoid of valve 86.

Considering the operation of the purging arrangement, lithium bromide solution—or any solution similar to the solution of absorbent and refrigerant employed in the refrigeration system—is discharged by pump 79 through ejector 81. Discharge of solution through the ejector induces non-condensible gases from the absorber through line 84. A properly designed ejector, of course, will pull a vacuum corresponding to the saturated vapor pressure of the liquid being discharged through it. The solution and non-condensible gases pass from the outlet of the ejector 81 through line 82 and loop 83 to the container where it is again circulated by pump 79 through this circuit. Non-condensible gases bubble off to atmosphere in the container.

Cooling coil 76, preferably, is supplied with chilled water from the refrigeration system. The solution in container 75 has a lower vapor pressure than solution circulated in the refrigerating system since it is cooler; thus, the suction pressure of ejector 81 is lower than pressure in the absorber. Since pressure at the suction of the ejector 81 is lower than the pressure in the absorber, non-condensible gases are withdrawn from the absorber through line 84. Solution in the container absorbs and condenses refrigerant so that the solution separates refrigerant from non-condensible gases. The non-condensible gases are extremely insoluble in lithium bromide solution thus permitting such separation. The non-condensible gases are released from the surface of solution in the container to the atmosphere.

As stated above, during the purging process, some amount of water vapor is gradually removed from the machine. The refrigerant or water vapor is absorbed and condensed by the solution in the container gradually weakening the solution, increasing its vapor pressure and also increasing the volume of solution in the container. Preferably, as hereinafter described, a small amount of strong solution may be added to solution in the tank to maintain a desired concentration. When the volume of solution in the container has increased to a predetermined level, float 88 is raised actuating switch 87 to close valve 86. Valve 86 closes line 82 so that liquid discharged by pump 79 is returned to the absorber of the refrigeration system through line 84 for reconcentration. That is, the ejector discontinues its function as a withdrawal means and serves instead as a return line to return solution to the refrigeration system for reconcentration. The return cycle is conducted in a matter of seconds.

When the volume of solution in the container decreases to a desired level, float valve 88 actuates switch 87 to open valve 86 and purging of the absorber is resumed. That is, pump 79 discharges solution into ejector 81 to circulate the solution in the container thereby inducing non-condensible gases from the absorber of the refrigeration machine. Any non-condensible gases retained in the solution and returned to the refrigeration system immediately leave the solution since there is a partial vacuum in the absorber, such non-condensible gases remaining underneath the absorber tubes so that they may be purged immediately from the system.

As stated above, the solution including the refrigerant is returned to the absorber, mixing with solution therein and being forwarded to the generator. In the generator, refrigerant is boiled off, condensed in the condenser and returned to the evaporator.

As shown in Figure 1 preferably, a pan or tube 90 is provided in the absorber to collect a small amount of lithium bromide solution from the absorber spray arrangement 25. This small amount of solution drains by gravity through line 91 to purge line 42 and is withdrawn with non-condensible gases to container 75. It will be appreciated, if desired, pan 90 and line 91 need not be provided since a minor amount of solution will enter the purge line through the openings therein in sufficient quantity to replenish the solution in the container although this is not as desirable since solution at the bottom of the coil is weaker. The amount of solution so provided is not critical since only a minimum amount of solution need be provided.

Figure 4:
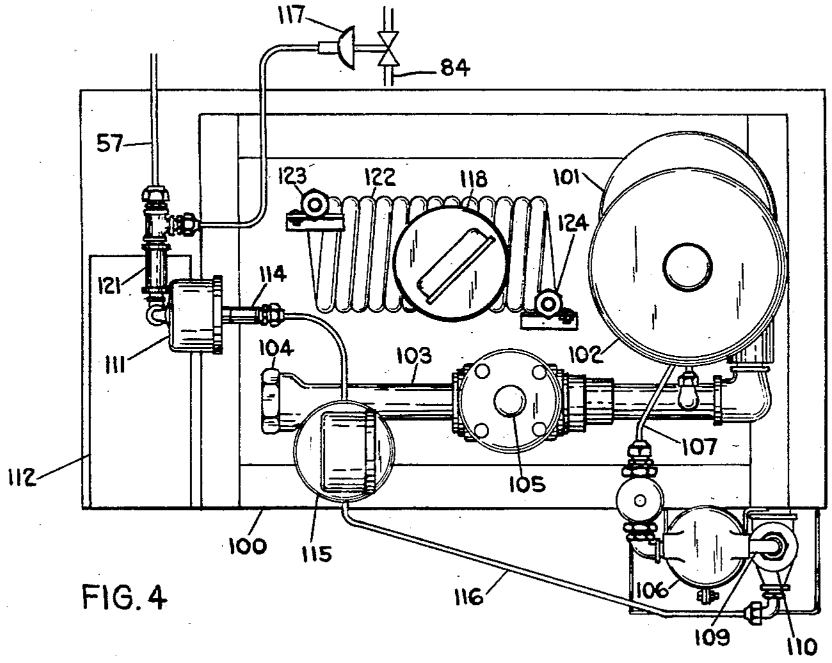
Figure 4 is a plan view of a purging arrangement illustrating a modified control.
Figure 6:
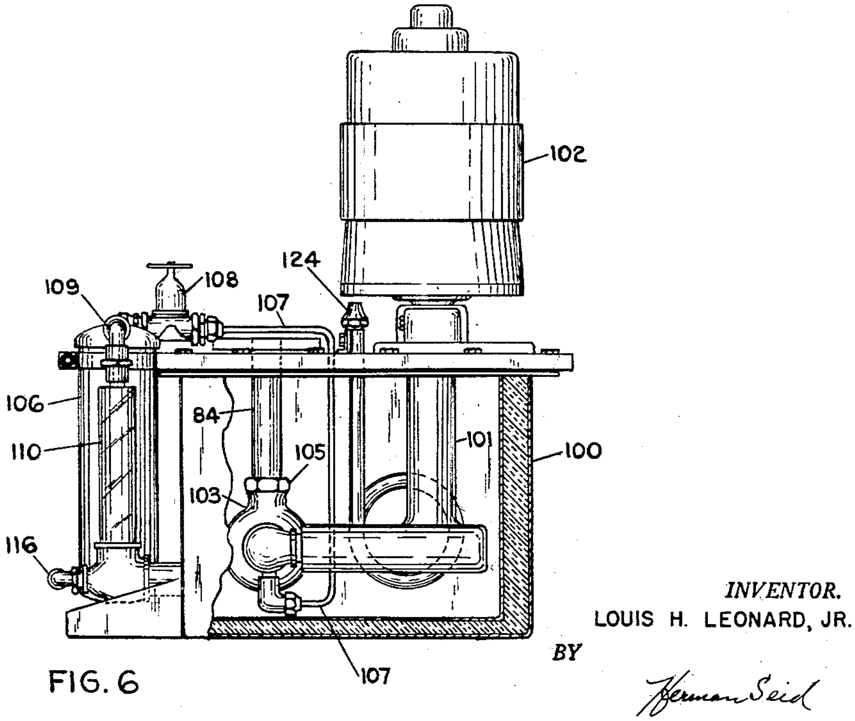
Figure 6 is a view in end elevation of the purging arrangement shown in Figures 4 and 5.

In Figures 4, 5 and 6, I have shown a modified form of the purging arrangement of the present invention. Referring to Figures 4, 5 and 6, there is shown a container 100 for lithium bromide solution. A pump 101 is placed within the container and is actuated by a motor 102. Pump 101 is connected to ejector 103, the nozzle outlet 104 of ejector 103 is open. The nozzle outlet and pump inlet are covered at all times by solution in the container. Ejector 103 is adapted to be connected to purge line 42 of the absorber by line 84, the connection to line 84 being shown at 105.

A filter arrangement 106 is connected to the pump discharge by line 107. A valve 108 regulates flow of absorbing solution to the filter. Solution flows from the filter through line 109 to a sight glass 110 through which the solution returns to the container.

A pressure sensing device 111 is conneced to the main air line 57 of the absorption refrigeration system. The pressure sensing device 111 is connected to an air tank 112, having a bleed 113 therein for a purpose hereinafter explained. Device 111 is connected by a T-restrictor 114 to a second pressure sensing device 115. Device 115 is connected by an air line 116 to the lower portion of sight glass 110.

Connected to the main air line upstream of pressure sensing device 111 is an automatic valve 117 which replaces manual valve 85 in line 84.

Preferably, a safety control 118 is provided in container 100. Safety control 118 includes a float 119 and a mercury switch 120 adapted to actuate valve 58 in main air line 57. If an excessive level of solution is reached in container 100, control 118 functions to discontinue air supply to the controls thereby discontinuing operation of the absorption refrigeration system.

Considering the operation of the purging arrangement, pump 101 draws solution from container 100 and forces the solution through ejector 103, the solution returning to the container 100. Simultaneously, pump 101 forces a small amount of solution through line 107 to the filter arrangement 106, solution passing through the filter being discharged into sight glass 110, returning from sight glass 110 to the container.

Discharge of solution in the ejector 103 withdraws non-condensible gases from the purge line 42 of the absorber, as previously explained.

Air pressure is applied through main air line 57 to pressure sensing device 111 and the automatic purging valve 117, forcing the automatic purging valve to open. It will be appreciated pressure sensing devices 111 and 115 are extremely sensitive to slight changes in pressure. As air fills air reservoir 112, the air flows to pressure sensing device 115 from device 111 through restrictor 114. From device 115 air passes through line 116 to the sight glass 110, bubbling upwardly through solution therein.

It will be appreciated since the sight glass is open to the container the level of solution therein is the same as the level of solution in the container. The sight glass permits an operator to observe that the solution is being cleaned, to observe the level of solution in the container, and to assure that air pressure is applied to pressure sensing devices 111, 115 since he can observe the air bubbling up through the solution in the sight glass.

With continued operation, the volume of solution in the container rises for a minor amount of water vapor and a small amount of absorbing solution is withdrawn from the absorber. Increase of volume of solution in the container to a predetermined level, increases the pressure imposed upon pressure sensing device 115 since it requires greater pressure to bubble air against the increased head in the sight glass. Device 115 is electrically connected to the motor 102 of pump 101, upon an increase in pressure imposed upon device 115 the motor of pump 101 is deenergized so that pump 101 discontinues operation. The pressure of ambient atmosphere under these circumstances is sufficient to force solution from the container through line 84 to the absorber. A decrease in volume of solution in the container to a predetermined level permits pressure imposed against device 115 to decrease thereby again energizing motor 102 of pump 101 to resume the purging operation.

The purpose of pressure sensing device 111, the air check valve 121 and the restrictor 114 is to provide a time delay so that upon start-up of the refrigeration system the purge pump is actuated before valve 117 in line 84 is opened and, on machine shutdown, the pump does not stop until valve 117 has closed. The air check valve 121 prevents backward flow of air to the main switch during the shutdown period.

The cooling coil 122 and connecting lines 123, 124 are similar to those previously described.

Figure 7:
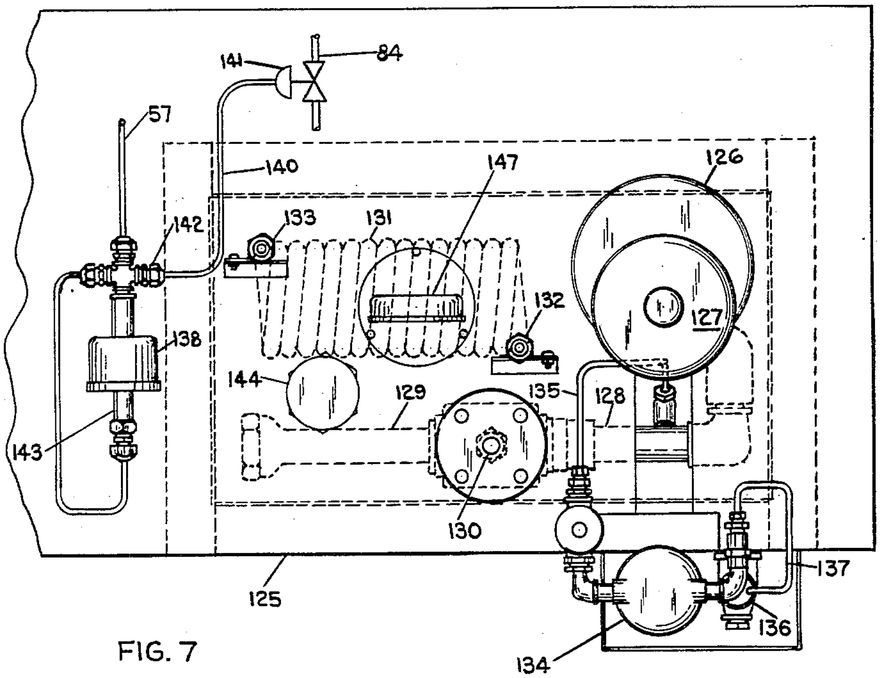
Figure 7 is a plan view of a purging arrangement illustrating a modified control.
Figure 8:
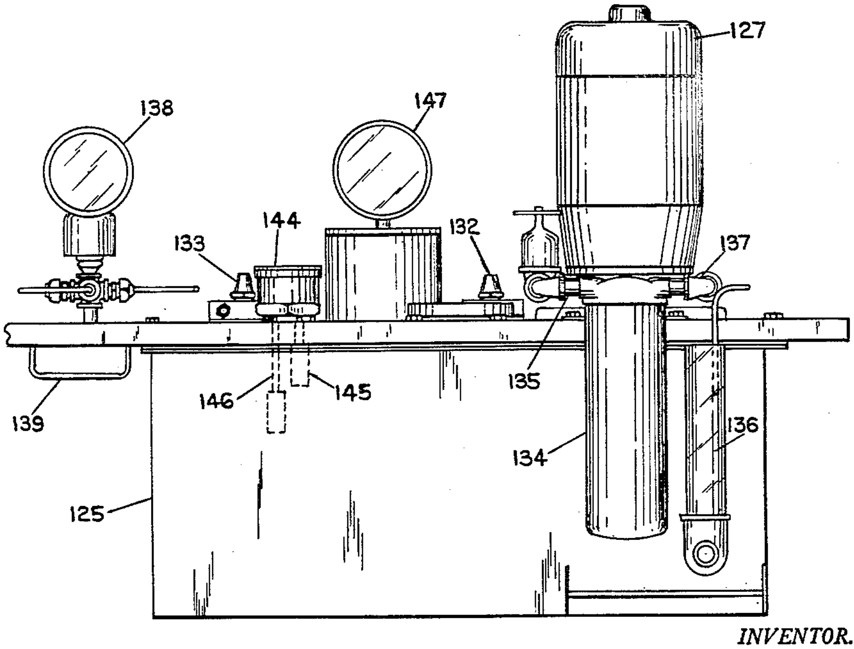
Figure 8 is a view in elevation of the purging arrangement shown in Figure 7.

In Figures 7 and 8, I have shown a further embodiment of the purging arrangement. The purging arrangement shown in Figures 7 and 8 is generally the same as the arrangement shown in Figures 4, 5 and 6 except that a different form of control is employed. The purging arrangement comprises a container 125, containing a pump 126 actuated by a motor 127. A line 128 connects pump 126 to ejector 129. Thus, solution is circulated in the container. Ejector 129 is connected by line 130 to line 84 connected to the purge line 42 of the absorber.

A cooling coil 131 is placed in container 125. Coil 131 is connected by line 132 to the discharge of the chilled water pump 36. The outlet of the coil is connected by line 133 to the evaporator 4 permitting chilled water passing through the coil to return to the evaporator for further cooling. A filter arrangement 134 is connected to the discharge of pump 126 by a line 135. Filtered solution is passed to the sight glass 136 through line 137, the filtered solution returning to container 125.

A pressure sensing device 138 sensitive to extremely small changes in pressure is connected to the main air line 57. The pressure sensing device includes an air reservoir 139 connected by line 140 to the automatic purging valve 141 placed in line 84. A restrictor 143 is placed in line 140. A check valve 142 may be placed in the branch line connecting the restrictor and the pressure sensing device to the main air supply line 57.

The volume of solution in the container is regulated by a liquid level control 144 mounted on the purge tank cover. This control is connected into an electrical circuit including pump 126 and is adapted to discontinue operation of the pump at a predetermined high solution level, that is, a predetermined increase in volume of solution in the container. The control 144 includes probes 145, 146 extending in container 125. As previously explained, under normal operation, the volume of solution in the container increases thus increasing the volume of solution or solution level in the container. At a predetermined level, the electrical circuit is deenergized thereby discontinuing operation of pump 126. Under these conditions, since pressure in the absorber shell is less than atmospheric pressure, the pressure of atmosphere will force solution in the container through the purge line to the absorber until the volume of solution in the tank has decreased to a predetermined low solution level. At this point, probe 145 is uncovered thereby energizing the electrical circuit to begin operation of pump 126 to resume purging of the absorber.

Safety control 147, similar to safety control 118 shown in Figures 4, 5 and 6, is also provided in this embodiment. Its operation was described previously. Control 147 includes a float (not shown) similar to float 119 described in Figures 4, 5 and 6.

Figure 9:
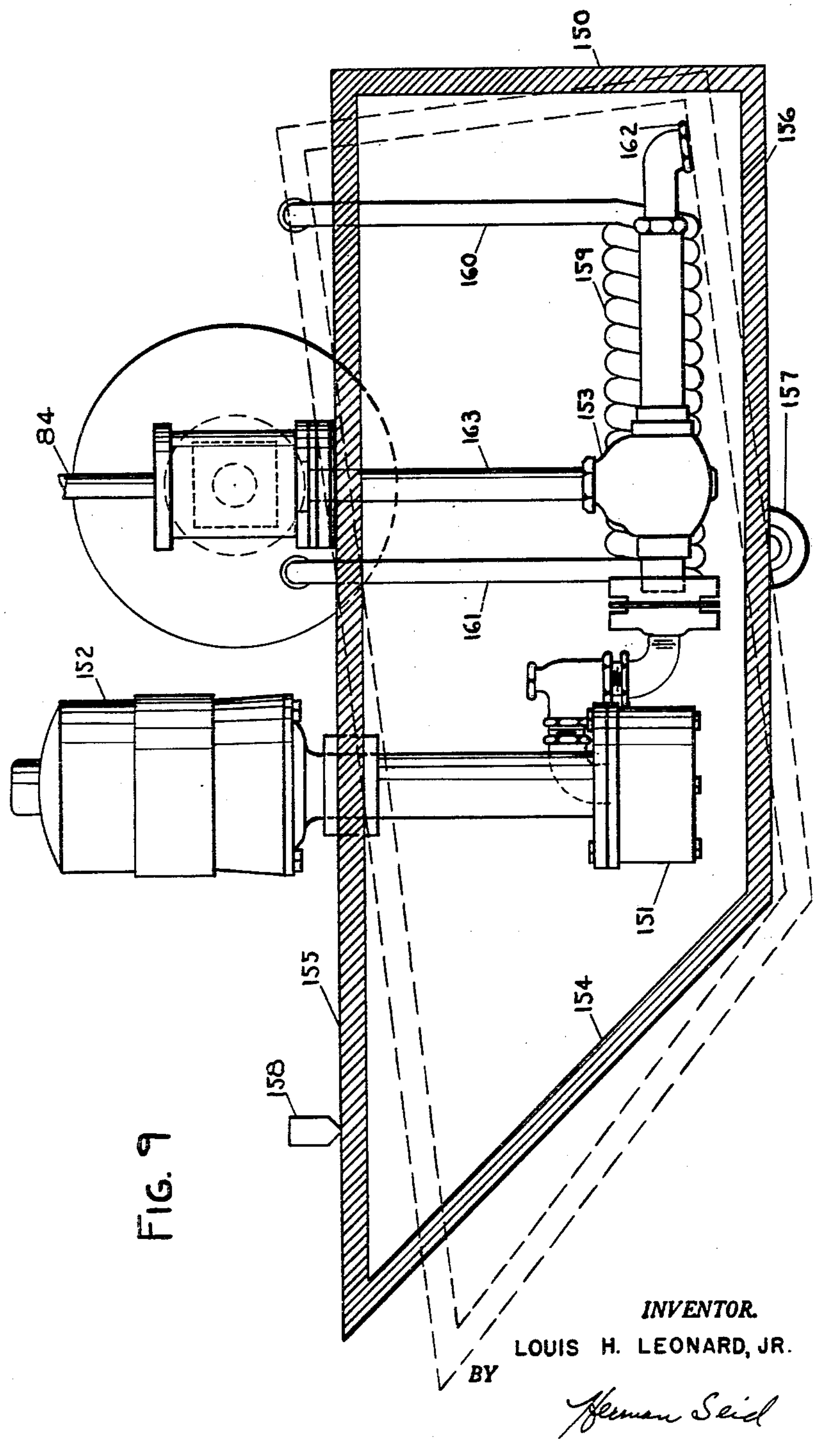
Figure 9 is a sectional view of a modified purging arrangement.
Figure 10:
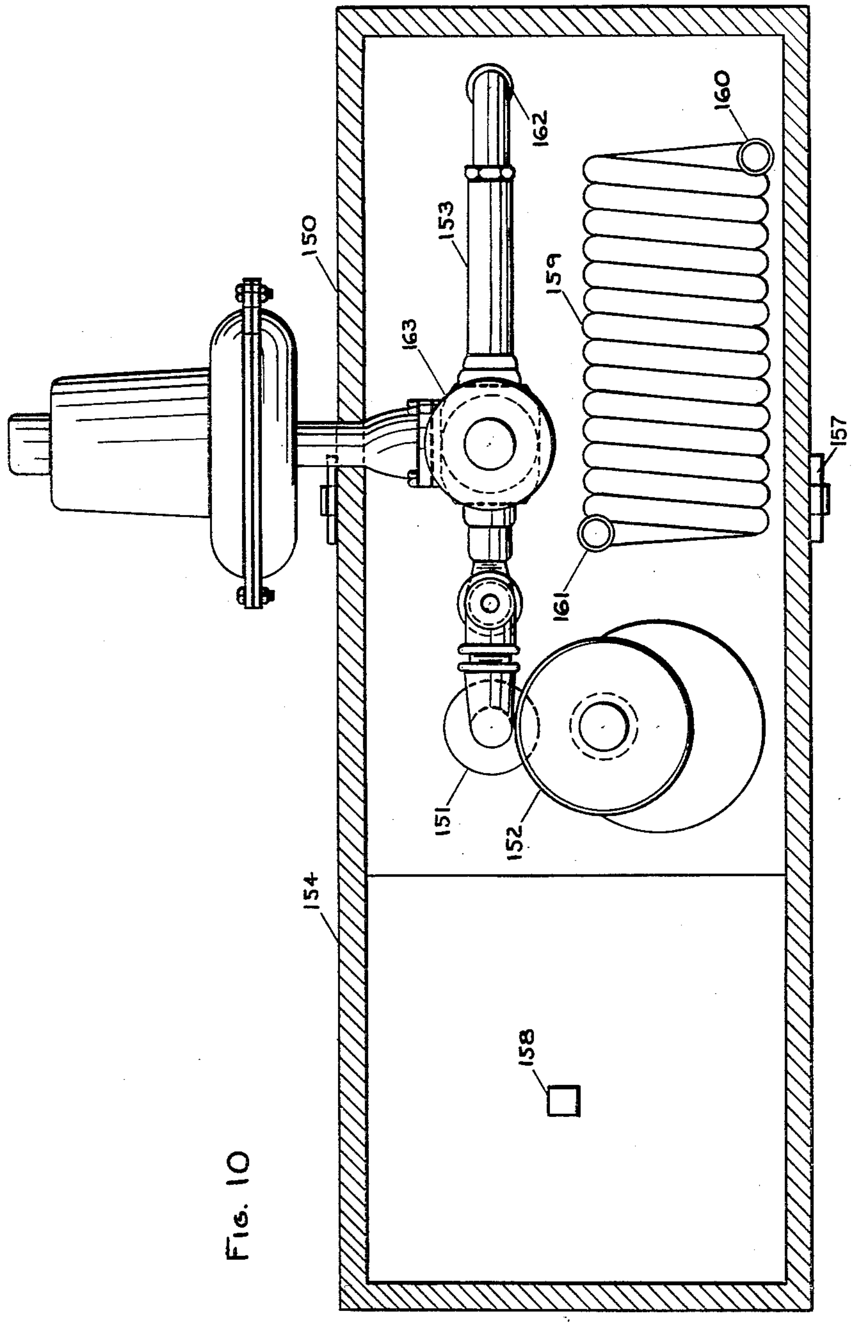
Figure 10 is a plan view of the purging arrangement shown in Figure 9.

In Figures 9 and 10 I have shown a further embodiment of the invention. Referring to Figures 9 and 10, there is shown a container 150 containing a pump 151 actuated by a motor connected in the electrical circuit of the system. The pump is connected to an ejector 153 to circulate the solution within the container.

The container 150 has one side 154 extending outwardly at an angle so that the top of the container is of greater length or has a greater area than the base 156 of the container. The container 150 is mounted on a pivot member 157; due to the contour of container 150, as the volume of solution in the container increases the container tilts or pivots on member 157, toward the left as shown in Figure 9, to the position shown in dotted outline. Suitable stop members such as member 158 may be provided to restrain movement of the container 150 beyond a desired point.

The usual cooling coil 159 is placed in container 150 and is connected by line 160 to the discharge of the chilled water pump 36, its outlet being connected by line 161 to the evaporator 4 of the refrigeration system.

The ejector has a nozzle outlet 162 so placed that tilting of container 150 raises base 156 to place the base against outlet 162 thereby substantially closing outlet 162. Ejector 153 is connected through line 163 and line 84 to purge line 42 in the absorber. The previously described automatic shutoff valve 164 may be provided in line 84.

Considering the operation of the purging arrangement, when volume of solution in the container increases to a predetermined level, container 150 tilts from its first or normal position to a second position, shown in dotted outlet in Figure 9. Movement of container 150 to a second position brings base 156 of the container in contact with nozzle outlet 162 of the ejector thereby substantially closing the outlet. Substantial closing of the outlet 162 permits pump 151 to pass solution from the container through line 163 and line 84 to purge line 42 of the absorber thereby returning solution from the container to the absorber. When the volume of solution in the container has decreased to a predetermined level, container 150 again resumes its first or normal position, thereby moving base 156 away from nozzle outlet 162 and permitting pump 151 to pass solution through the ejector outlet to the container. Solution passing through the ejector, of course, as previously described, induces non-condensible gases from the absorber.

Figure 11:
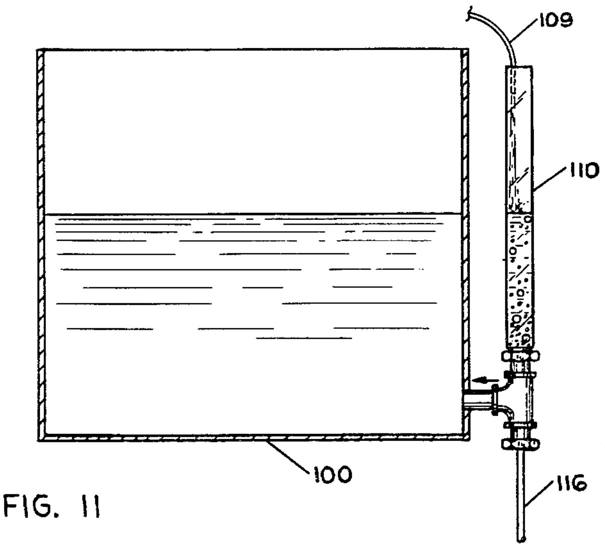
Figure 11 is a sectional view of a suitable level indicator employed in the purging arrangement.

In Figure 11 I have shown diagrammatically the manner in which the sight glass functions. It will be observed the sight glass 110 is connected to tank or container 100 so that the same level of solution is maintained in the sight glass as in the container. Solution from the filter arrangement emptied within sight glass 110 flows downwardly therein thereby keeping the sight glass clean during use. Air from pressure sensing device 115 is passed through line 116 to the sight glass and bubbles upwardly therein. This arrangement permits the solution level in the tank and solution flow through the filter, both the amount of flow and the cleanliness of the solution, to be noted and also provides an indication of the operation of pressure sensing device 115. If desired, the sight glass may be equipped with a scale indicating maximum and minimum operating levels in the container and graduated so that a change in level during shutdown can be observed.

Figure 12:
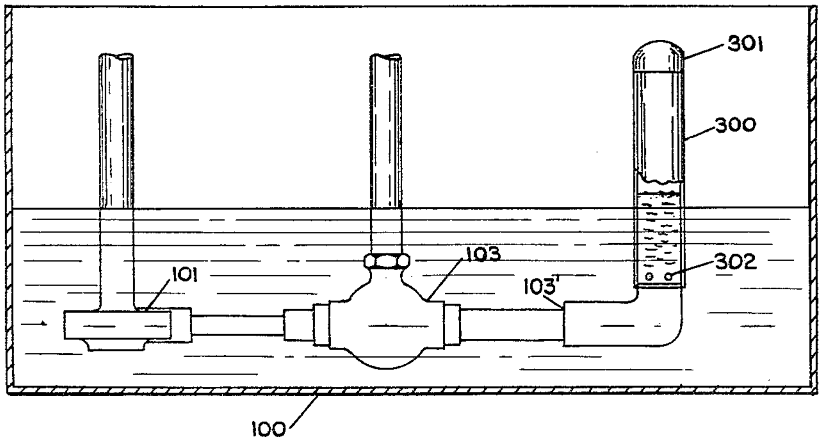
Figure 12 is a diagrammatic view of a muffling or silencing arrangement which may be employed in the purging arrangement if desired.

Under some circumstances, the discharge of the ejector (refer to Figures 4, 5 and 6) may create undesirable gurgling noises. In Figure 12 there is shown a muffling arrangement or silencer which may be employed to dampen such noises. A pipe 300 having a closed end 301 is fitted to the discharge 103' of the ejector. A plurality of openings 302 are formed in the bottom of the silencer to provide outlets for the solution being circulated. Atmospheric air is trapped in the closed end 301 of pipe 300 so that the solution level in the tube fluctuates depending upon solution level in the container. The air pocket so formed dampens undesirable noises created by the discharge of solution.

The present invention provides a simple inexpensive purging arrangement for use with an absorption refrigeration system. While I have described the purging arrangement as being employed with the absorption refrigeration machine shown in my copending application, Serial No. 505,369, filed May 2, 1955, it will be understood, of course, that the purging arrangement may be used with any desired type of absorption refrigeration system, for example, the absorption refrigeration system shown in Berestneff, Patent No. 2,565,943, which has entered into extensive use.

The present invention eliminates any requirement for make-up refrigerant in the absorption refrigeration system with which it is employed. The refrigeration system is maintained under vacuum during shutdown since the main purge valve isolates the machine from the purging unit thus eliminating any possibility of non-condensible gases seeping into the machine during shutdown through the purge line. It is not necessary to provide an overflow for the purging arrangement since the controls operate to discontinue operation of the system before overflow of solution in the container can occur; thus, loss of solution from the refrigeration system is practically impossible.

An advantage of the purging arrangement resides in the fact that the purging lines in the absorber are washed automatically for solution from the container is returned to the system therethrough. If the purging arrangement collects too great a volume of solution therein the solution is pumped back into the machine automatically. If solution is withdrawn from the system accidently, it is returned thereby preventing loss of solution from the system, a great economy over arrangements heretofore used in which such solution was necessarily lost.

The present invention provides a purging arrangement for an absorption refrigeration system in which purging may be done in a single stage rather than two or three stages. All of the refrigerant vapor purged from the system is reclaimed and returned to the system. Maintenance is reduced by the elimination of small orifices and wet stream problems as well as the elimination of auxiliary services external to the system such as steam lines, drains, etc. The purging arrangement is completely self-contained and eliminates accidental solution loss from the system.

While I have described certain preferred embodiments of the present invention, it will be understood the invention is not limited thereto since it may be otherwise embodied within the scope of the following claims.

I claim:

1. In a purging arrangement for an absorption refrigeration system, the combination of a container for an absorbent solution, means for circulating solution in the container adapted to be operatively connected to the absorber to induce non-condensible gases therefrom, means for cooling the absorbent in the container so that it possesses a lower vapor pressure than absorbent circulated in the system, a line to connect the first means with the absorber of the system whereby circulation of solution in the container by said first means induces non-condensible gases from the absorber and forwards the non-condensible gases through said line to the container for discharge to ambient atmosphere, and means for discontinuing withdrawal of non-condensible gases from the absorber while permitting solution in the container to be forwarded to the absorber through said line.

2. A purging arrangement for an absorption refrigeration system according to claim 1 in which the absorbent solution comprises a solution of lithium bromide and water.

3. A purging arrangement for an absorption refrigeration system according to claim 1 in which means are provided for supplying a desired amount of absorbent solution from the system to the container to assure a desired absorbent concentration in the container.

4. In a purging arrangement for an absorption refrigeration system, the combination of a container containing an absorbent solution, means for circulating solution in the container adapted to be operatively connected to the absorber to induce non-condensible gases therefrom, a line connecting the circulating means with the absorber of the system whereby circulation of solution in the container by said circulating means induces non-condensible gases from the absorber and forwards the non-condensible gases through said line to the container for discharge to ambient atmosphere, and means for discontinuing the withdrawal of non-condensible gases from the absorber while permitting solution in the container to be forwarded to the absorber through said line.

5. A purging arrangement for an absorption refrigeration system according to claim 4 in which the last named means are responsive to a predetermined increase in volume of solution in the container.

6. A purging arrangement for an absorption refrigeration system according to claim 5 in which means are provided for automatically discontinuing solution supply to the absorber from the container and for resuming withdrawal of non-condensible gases from the absorber responsive to a predetermined decrease in volume of solution in the container.

7. In a purging arrangement for an absorption refrigeration system, the combination of a container, means for displacing solution in the container, an ejector in said container connected to said first means to receive displaced solution therefrom and to discharge the displaced solution into the container, a line adapted to connect the ejector with the absorber of the system whereby discharge of solution through the ejector by said first means induces non-condensible gases from the absorber and forwards the non-condensible gases through said line to the container for discharge to ambient atmosphere, and means for discontinuing withdrawal of non-condensible gases from the absorber while permitting solution in the container to be forwarded to the absorber through said line.

8. In a purging arrangement for an absorption refrigeration system, the combination of a container, a cooling coil in said container in heat exchange relation with solution in the container, a pump for displacing solution in the container, an ejector connected to said pump to receive displaced solution therefrom and to discharge the displaced solution into the container, a line adapted to connect the ejector with the absorber of the system whereby discharge of solution through the ejector by said pump induces non-condensible gases from the absorber and forwards the non-condensible gases through said line to the container for discharge to ambient atmosphere, and means for discontinuing withdrawal of non-condensible gases from the absorber while permitting solution in the container to be forwarded to the absorber through said line.

9. In a purging arrangement for an absorption refrigeration system, the combination of a container, a pump for displacing solution in the container, an ejector connected to said pump to receive displaced solution therefrom and to discharge the displaced solution into the container, a line to connect the ejector with the absorber of the system whereby discharge of solution through the ejector by said pump induces non-condensible gases from the absorber through said line and forwards the non-condensible gases to the container for discharge to ambient atmosphere, and means for changing the direction of flow of solution through the ejector to forward solution from the container through said line to the absorber.

10. In a purging arrangement for an absorption refrigeration system, the combination of a container, a cooling coil in said container in heat exchange relation with solution in the container, a pump for displacing the solution in the container, an ejector connected to the pump to receive displaced solution therefrom and to discharge the displaced solution into the container, a line adapted to connect the ejector with the absorber of the system whereby discharge of solution through the ejector by said pump induces non-condensible gases from the absorber and forwards the non-condensible gases through said line to the container for discharge to ambient atmosphere, and means for changing the direction of flow of solution through the ejector to discontinue withdrawal of non-condensible gases from the absorber and to forward solution from the container through said line to the absorber.

11. In a purging arrangement for an absorption refrigeration system, the combination of a container, a cooling coil in said container in heat exchange relation with solution in the container, a pump in said container for passing solution in the container in a closed circuit, an ejector placed in said container in said circuit connected to said pump to receive solution therefrom and to discharge the solution in the container, a line adapted to connect the ejector with the absorber of the system whereby discharge of solution through the ejector by said pump induces non-condensible gases from the absorber and forwards the non-condensible gases to the container for discharge to ambient atmosphere, and means for closing the circuit while continuing operation of the pump to forward solution from the container through said line to the absorber.

12. In a purging arrangement for an absorption refrigeration system, the combination of a container, means placed in said container for circulating solution in the container in a closed circuit, an ejector placed in said container connected to said means to receive solution therefrom and to discharge the solution in the container, means adapted to connect the ejector with the absorber of the system whereby discharge of solution through the ejector by said first means induces non-condensible gases from the absorber and forwards the non-condensible gases to the container for discharge to ambient atmosphere, and means to close said circuit while continuing operation of said first means to forward solution from the container to the absorber.

13. In a purging arrangement for an absorption refrigeration system, the combination of a container, means for circulating solution in the container in a closed circuit, an ejector discharging into the container connected to said means to receive solution therefrom and to discharge the solution in the container, a line to connect the ejector with the absorber of the system whereby discharge of solution through the ejector by said means induces non-condensible gases from the absorber and forwards the non-condensible gases through said line to the container for discharge to ambient atmosphere, and means to discontinue operation of said circulating means thereby permitting the pressure of ambient atmosphere to forward solution from the container through the ejector and through said line to the absorber.

14. In a purging arrangement for an absorption refrigeration system, the combination of a container, a cooling coil in said container in heat exchange relation with solution in the container, a pump for displacing solution in the container, an ejector connected to the pump to receive displaced solution therefrom and to discharge the displaced solution into the container, a line connected to the ejector through which the solution in the container is circulated, a second line adapted to connect the ejector with the absorber of the system whereby discharge of solution through the ejector by said pump induces non-condensible gases from the absorber and forwards the non-condensible gases to the container for discharge to ambient atmosphere, means for closing said first line, a control member for said line closing means, and a float in said container adapted to actuate said control responsive to a predetermined level of solution in the container thereby discontinuing passage of solution through the first line and permitting the pump to supply solution from the container to the absorber through he second line, movement of the float to a second position deenergizing the control to open the first line permitting passage of solution therethrough and preventing passage of solution through the second line while permitting the ejector to withdraw non-condensible gases from the absorber.

15. A purge for an absorption refrigeration system, according to claim 14 in which the closing means in said first line comprises a solenoid valve and the control therefor comprises a switch adapted to energize or to deenergize the solenoid valve dependent upon predetermined movement of the float.

16. In a purging arrangement for an absorption refrigeration system, the combination of a container, a cooling coil in said container in heat exchange relation with solution in the container, a pump for displacing the solution in the container, an ejector connected to the pump to receive displaced solution therefrom and to discharge the displaced solution into the container, a line adapted to connect the ejector with the absorber of the system whereby discharge of solution through the ejector by said pump induces non-condensible gases from the absorber and forwards the non-condensible gases to the container for discharge to ambient atmosphere, a vaporstat connected to said container, a pressure control connected to said container whereby in response to an increase in pressure in a predetermined pressure applied thereto operation of the pump is discontinued thereby discontinuing circulation of solution in the container and permitting ambient atmosphere to force solution from the container to the absorber.

17. A purging arrangement for an absorption refrigeration system according to claim 16 in which a second predetermined change in pressure in the pressure control again actuates the pump to circulate solution in the container and to withdraw non-condensible gases from the absorber.

18. In a purging arrangement for an absorption refrigeration system, the combination of a container, a cooling coil in said container in heat exchange relation with solution in the container, a pump in said container for displacing solution in the container, an ejector in said container connected to the pump to receive displaced solution therefrom and to discharge the displaced solution into the container, a line adapted to connect the ejector with the absorber of the system whereby discharge of solution through the ejector by said pump induces non-condensible gases from the absorber and forwards the non-condensible gases to the container for discharge to ambient atmosphere, a motor to actuate said pump, an electrical circuit including said motor, and means in said electrical circuit responsive to level of solution in the container to discontinue operation of said pump thereby permitting ambient atmosphere to force solution from the container through said ejector and through said line to the absorber.

19. An absorption refrigeration system according to claim 18 in which said control means comprise a plurality of spaced probes in said container, increase in volume of solution in the container completing a circuit between said probes to discontinue operation of said pump permitting solution to be forced to flow to the absorber, a predetermined decrease in solution volume in said tank again energizing the pump motor to actuate the pump to withdraw non-condensible gases from the absorber.

20. A purging arrangement for an absorption refrigeration system according to claim 18 in which a safety control is provided to automatically discontinue operation of the pump when a predetermined solution volume in the container is attained.

21. In a purging arrangement for an absorption refrigeration system, the combination of a container, a pivot member supporting the container in a balanced first position, said container tilting upon said pivot member when a desired level of solution in the container is reached, a cooling coil in said container in heat exchange relation with solution in the container, a pump for displacing solution in the container, an ejector connected to the pump to receive displaced solution therefrom and having a nozzle opening through which the displaced solution is discharged into the container, a line adapted to connect the ejector with the absorber system whereby discharge of solution through the ejector by said pump induces non-condensible gases from the absorber and forwards the non-condensible gases to the container for discharge to ambient atmosphere, a predetermined increase in solution volume in the container tilting the container to bring the base of the container in contact with the nozzle opening thereby preventing substantially passage of solution through the nozzle opening and permitting the pump to supply the solution through said line to the absorber, decrease in volume of solution in the container permitting the container to return to its original position thereby permitting circulation of solution in the container and withdrawal of non-condensible gases from the absorber.

22. A purging arrangement for an absorption refrigeration system according to claim 21 in which stop means are provided to regulate movement of the container.

23. In a purging arrangement for an absorption refrigeration system, the combination of a container containing an absorbent solution, first means for circulating solution in the container adapted to be operatively connected to the absorber to induce non-condensible gases therefrom, a line connecting the first means with the absorber of the system whereby circulation of solution in the container by said first means induces non-condensible gases from the absorber and forwards the non-condensible gases to the container for discharge to ambient atmosphere, means for discontinuing withdrawal of non-condensible gases from the absorber, while permitting solution in the container to be forwarded to the absorber through said means, a filter arrangement connected to the circulating means, and means for returning solution from the filter arrangement to the container.

24. The purging arrangement for an absorption refrigeration system according to claim 23 in which a line connects the filter arrangement with the circulating means, a loop being placed in said line to prevent air being drawn into the system when operation of the circulating means is discontinued.

25. In a purging arrangement for an absorption refrigeration system, the combination of a container, first means for displacing solution in the container, an ejector connected to said first means to receive displaced solution therefrom and to discharge the displaced solution into the container, second means adapted to connect the ejector with the absorber of the system whereby discharge of solution through the ejector by said first means induces non-condensible gases from the absorber and forwards the non-condensible gases to the container for discharge to ambient atmosphere, third means for discontinuing withdrawal of non-condensible gases from the absorber while permitting solution in the container to be forwarded to the absorber through said second means, a filter arrangement, a line connecting the filter arrangement to the circulating means and means for returning filtered solution to the container, said line having a loop therein to prevent air being drawn into the system when operation of the circulating means is discontinued.

26. In a purging arrangement for an absorption refrigeration system, the combination of a container, a pump for circulating solution in the container in a closed circuit, an ejector connected to said pump to receive solution therefrom and to discharge the solution in the container, a prime mover for said pump, means adapted to connect the ejector with the absorber of the system whereby discharge of solution through the ejector by the pump induces non-condensible gases from the absorber and forwards the non-condensible gases to the container for discharge to ambient atmosphere, means to discontinue operation of the pump in response to a predetermined increase in solution level in the container, a filter arrangement, a line connecting the filter arrangement to the pump discharge, means for passing solution from the filter arrangement to the container, and a loop in said line to prevent air being drawn into the system when operation of the pump is discontinued.

27. In a purging arrangement for an absorption refrigeration system, the combination of a container, a cooling coil in said container in heat exchange relation with solution in the container, means to supply chilled water from the system to said coil, means to return chilled water after passage through the coil to the system, a pump for displacing solution in the container, an ejector connected to said pump to receive displaced solution therefrom and discharge the displaced solution into the container, a line adapted to connect the ejector with the absorber of the system whereby discharge of solution through the ejector by said pump induces non-condensible gases from the absorber through said line to the container for discharge to ambient atmosphere, and means for discontinuing withdrawal of non-condensible gases from the absorber while permitting solution in the container to be forwarded to the absorber through said line.

28. In a method of purging an absorption refrigeration system including an absorber, an evaporator, a generator and a condenser, the steps which consist in circulating solution in a container to induce non-condensible gases through a line connecting the absorber and the container, and, when the volume of solution in the container increases to a desired level, discontinuing withdrawal of non-condensible gases from the absorber while supplying solution in the container through said line to the absorber.

29. A method of purging an absorption refrigeration system, according to claim 28 including the step of supplying a desired amount of absorbent from the system to the container.

30. In a method of purging an absorption refrigeration system including an absorber, an evaporator, a generator and a condenser the steps which consist in circulating solution in a container in a predetermined path to induce non-condensible gases from the absorber, then, when the volume of solution in the container increased to a predetermined level, discontinuing the flow of solution in said path thereby discontinuing withdrawal of non-condensible gases from the absorber and supplying solution in the container to the absorber, and, when the volume of solution in the container has decreased to a predetermined level, resuming solution flow in said predetermined path thereby discontinuing supply of solution to the absorber and again withdrawing non-condensible gases from the absorber.

(References on following page)

References Cited in the file of this patent

UNITED STATES PATENTS

| | | |
|---|---|---|
| 2,363,381 | Anderson | Nov. 21, 1944 |
| 2,363,440 | Roswell | Nov. 21, 1944 |
| 2,374,521 | Anderson | Apr. 24, 1945 |
| 2,400,137 | Reid | May 14, 1946 |
| 2,400,138 | Buffington | May 14, 1946 |
| 2,426,069 | Thomas | Aug. 19, 1947 |
| 2,473,384 | McNeely | June 14, 1949 |
| 2,494,972 | Thomas et al. | Jan. 17, 1950 |
| 2,510,737 | Buffington | June 6, 1950 |
| 2,522,410 | Thomas | Sept. 12, 1950 |
| 2,610,482 | Berry | Sept. 16, 1952 |